Figure 1:
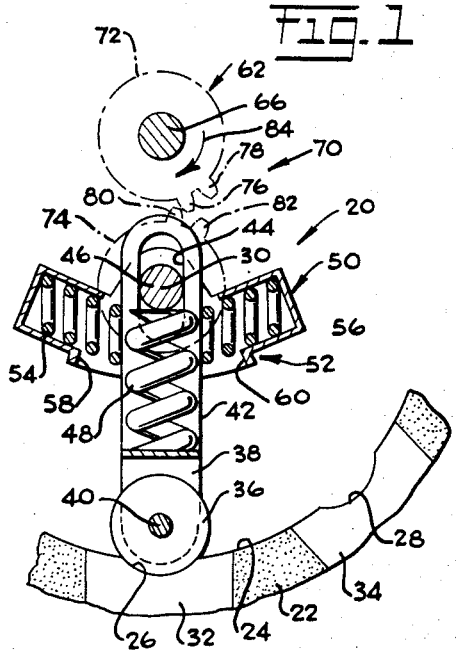

Sept. 13, 1960 H. F. MASON 2,952,750
MOTOR DRIVEN ROTARY SWITCH
Filed July 11, 1958 4 Sheets-Sheet 1

HOWARD F. MASON,
INVENTOR.
BY HIS ATTORNEYS
HARRIS, KIECH, FOSTER & HARRIS

Sept. 13, 1960  H. F. MASON  2,952,750
MOTOR DRIVEN ROTARY SWITCH
Filed July 11, 1958  4 Sheets-Sheet 2

HOWARD F. MASON,
INVENTOR.
BY HIS ATTORNEYS
HARRIS, KIECH, FOSTER & HARRIS

HOWARD F. MASON,
INVENTOR.
BY HIS ATTORNEYS,
HARRIS, KIECH, FOSTER & HARRIS

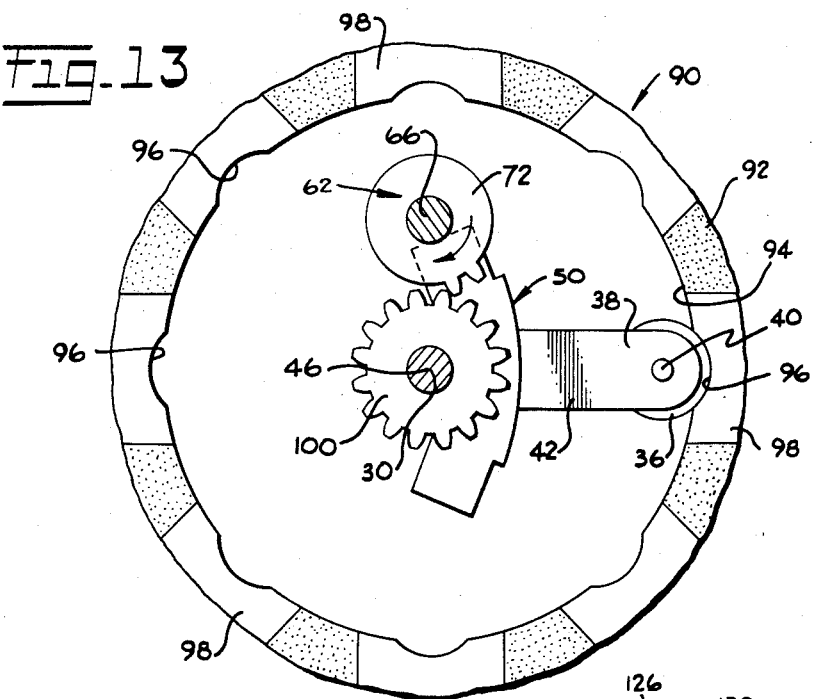
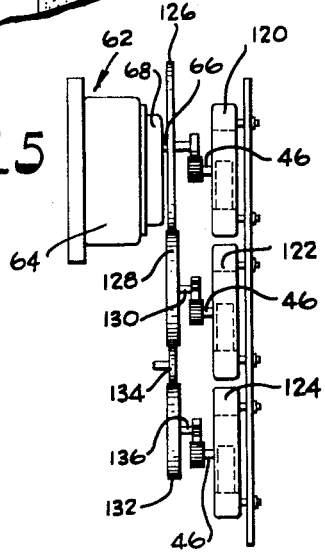
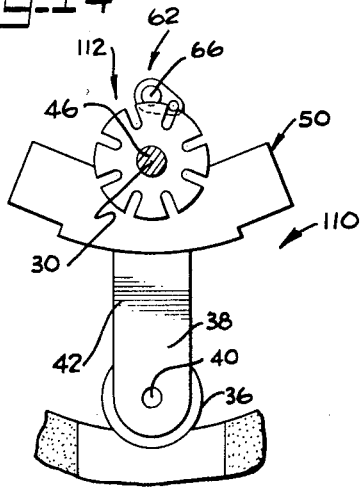
HOWARD F. MASON,
INVENTOR.
BY HIS ATTORNEYS,
HARRIS, KIECH, FOSTER & HARRIS

United States Patent Office 2,952,750
Patented Sept. 13, 1960

2,952,750

MOTOR DRIVEN ROTARY SWITCH

Howard F. Mason, Los Angeles, Calif., assignor to Mason Electric Corporation, Los Angeles, Calif., a corporation of California Filed July 11, 1958, Ser. No. 747,997

9 Claims. (Cl. 200—26)

The present invention relates in general to rotary switches and, more particularly, to the combination of a rotary switch and a drive therefor which includes a rotary motor.

Rotary switches driven by rotary motors have been proposed heretofore, but have not proven satisfactory because, with the rotary switches used, such prior combinations require an unsatisfactory compromise between the high motor speeds necessary for optimum switch operation and the lower motor speeds needed for controlled motor coasting and stopping. In other words, with such a prior combination, if the motor speed is high enough for optimum switch operation, coasting of the motor and the stopping positions thereof cannot be controlled with sufficient accuracy, and, if the motor speed is low enough for satisfactory control of coasting and stopping of the motor, then the switch does not move fast enough for best operation.

In view of the foregoing, the rotary switching industry has had to rely upon rotary solenoids. Such a device rotates a given number of degrees and then returns to its starting position under the influence of spring action, a ratchet means being utilized in conjunction therewith if step-by-step movement in one direction is required. The return movement of a rotary solenoid in response to spring action is sufficiently long that the circuits controlled by the rotary switch can function when the switch-solenoid combination is used in stepping operations. However, rotary solenoids have numerous disadvantages. For example, stepping speed cannot be controlled accurately and there is no flexibility in operation. When a reversing operation is required, two rotary solenoids respectively operating in opposite directions are necessary, which increases cost and weight. The operating current of a rotary solenoid for a given torque is very high, which is another disadvantage. A further disadvantage is that short, controlled time delays between steps are not feasible without complex timing equipment. Finally, rotary solenoids require critical adjustments which must be maintained accurately.

A general object of the present invention is to provide a rotary switch, rotary motor combination which eliminates the foregoing disadvantages of prior combinations of this type and which eliminates the disadvantages of rotary solenoid, rotary switch combinations.

More particularly, a primary object of the invention is to provide a rotary switch driven by a rotary motor wherein the movement of the switch from one position to another is substantially completely independent of the movement of the motor, thereby permitting the use of a motor speed slow enough to provide reasonably accurate control of the coasting of the motor, and thus of the stopping positions thereof, in instances where it is desired to stop the motor after movement of the rotary switch from one position to another.

A related and important object is to provide a rotary motor, rotary switch combination wherein the rotary switch is insensitive to even relatively large variations in the stopping positions of the motor so that the switch will be moved to and remain in a selected position even if the motor overruns or underruns its corresponding stopping position by a substantial extent.

The foregoing objects may be achieved by utilizing as the rotary switch of the rotary motor and rotary switch combination one of the rotary switches disclosed in my Patents Nos. 2,831,073, 2,831,082, and 2,831,081, all issued April 15, 1958, and in my copending patent application Serial No. 710,796, filed January 23, 1958. Such a rotary switch includes an arcuate contact path having a center of curvature and having circumferentially spaced recesses therein and having thereon at least one stationary contact in which one of the recesses is formed, a contact carrier movable adjacent and parallel to the contact path about the center of curvature thereof, a roller contact rotatably mounted on the contact carrier and engaging and movable along the contact path and insertable into each of the recesses, an actuator movable about the center of curvature of the contact path, means providing a resilient angular-lost-motion connection between the actuator and the contact carrier, kicking means carried by the actuator and engageable with the contact carrier for limiting the range of angular lost motion between the actuator and the contact carrier so as to kick the roller contact out of each of the recesses, and resilient means engaging the actuator and the contact carrier for biasing the roller contact into engagement with the contact path.

Another object of the invention is to provide a rotary motor, rotary switch combination wherein the rotary motor forms part of a rotary drive means comprising an output shaft connected to the actuator of the rotary switch by a driving connection which transmits rotation of the output shaft to the actuator so as to move the actuator about the center of curvature of the contact path, thereby causing the roller contact to move from one recess in the contact path to the next.

With the foregoing construction, the energy stored in the resilient angular-lost-motion connection results in jumping of the roller contact from one recess to the next substantially independently of the rotary motor, which means that the motor speed may be slow enough to provide reasonable control over coasting thereof in the event that stopping of the motor after jumping of the roller contact is desired. Also, the angular lost motion between the actuator and the contact carrier permits considerable overrunning or underrunning of the motor without preventing the roller contact from reaching and remaining in the recess toward which it jumps, which is an important feature.

An important object of the invention is to provide a driving connection between the output shaft and the switch actuator which is intermittent, the driving connection disengaging after each jump of the roller contact from one recess to another.

Another object is to provide an intermittent driving connection between the switch actuator and the output shaft in conjunction with a reversible motor, this combination of elements resulting in jumping of the roller contact back and forth between two recesses in the contact path. With this construction, since the driving connection between the output shaft and the switch actuator is disengaged after each jump of the roller contact, the distance which the motor coasts before reaching its stopping position is immaterial so long as the coasting distance is not sufficient to rotate the output shaft through one complete revolution and thus reengage the driving connection in the same direction as it was engaged originally.

Another object is to provide an intermittent driving connection which is unidirectional and which disengages after each jump of the roller contact so that the rotary switch is stepped, i.e., so that the roller contact is progressively moved from one to another of a series of recesses in the contact path. Again, in the event that stopping of the motor between roller contact jumps is desired, the extent of coasting of the motor is immaterial, subject to the limitation discussed in the preceding paragraph in connection with the reversible motor mentioned therein.

Another object is to provide a driving connection which includes a gear segment on the output shaft adapted to mesh with a gear connected to the actuator of the rotary switch, it merely being necessary that the gear connected to the switch actuator be a gear segment when the rotary motor is a reversible one utilized in conjunction with a switch which is jumped back and forth between two positions.

An important feature of the invention in conjunction with a driving connection between the switch actuator and the output shaft which utilizes gear segments is that the angular lost motion of the rotary switch insures that the gear segment connected to the switch actuator will be in a position to be engaged by the gear segment on the output shaft upon reversal of the direction of rotation of the output shaft, as will be explained in more detail hereinafter.

While the driving connection between the switch actuator and the output shaft has been discussed specifically above as including combinations of gear segments and gears, it will be understood that cam-type driving connections, such as Geneva mechanisms, may be utilized also.

The foregoing objects, advantages, features and results of the present invention, together with various other objects, advantages, features and results thereof which will be evident to those skilled in this art in the light of the present disclosure, may be attained with the exemplary embodiments of the invention described in detail hereinafter and illustrated in the accompanying drawings, in which:

Figs. 1 to 12 are semidiagrammatic views illustrating the structure of and successive steps in the operation of one embodiment of the invention; and Figs. 13, 14 and 15 are semidiagrammatic views respectively illustrating other embodiments of the invention.

Referring particularly to Fig. 1 of the drawings, illustrated semidiagrammatically therein is a switch 20 which embodies the fundamental principles of those disclosed in my aforementioned patents and patent application. The switch 20 includes a structure 22 which provide a contact path 24 having circumferentially spaced recesses 26 and 28 therein, the contact path being arcuate and concave and the recesses facing radially inwardly toward the center of curvature 30 of the contact path. At least one of the recesses 26 and 28 is formed in a stationary contact on the contact path 24, both of the recesses 26 and 28 being formed in stationary contacts 32 and 34, respectively, in the particular construction illustrated. The structure 22 between the stationary contacts 32 and 34 is formed of electrical insulating material.

Movable along the contact path 24 and receivable in each of the recesses 26 and 28 is a roller contact 36 rotatably mounted on a contact carrier 38 by means of an axle 40. The contact carrier 38 forms part of a rotor 42 having therein a radial slot 44 which receives a shaft 46 at the center of curvature 30 of the contact path 24, the slot 44 permitting radial movement of the roller contact 36 relative to the shaft 46 and into and out of each of the recesses 26 and 28. The contact carrier 38 and the rotor 42 are biased away from the center of curvature 30 of the contact path 24 by a compression spring 48 acting between the contact carrier 38 and the shaft 46, whereby this spring biases the roller contact into engagement with the contact path.

It will be understood that while the contact carrier 38 is shown as an integral part of the rotor 42 and that while the rotor and the contact carrier are shown as both radially movable toward and away from the contact path 24, the rotor 42 may be radially immovable and the contact carrier 38 may be mounted on the rotor for radial movement relative thereto toward and away from the center of curvature 30 of the contact path, the spring 48 still acting on the contact carrier 38 under such circumstances to bias the roller contact into engagement with the contact path. Such structures are incorporated in the actual embodiments illustrated in the aforementioned patents and patent application.

The switch 20 includes a rotary actuator 50 which is rotatable about the center of curvature 30 of the contact path 24 and which is rigidly connected to the shaft 46 in the particular construction illustrated. A rotation transmitting means 52 provides a resilient angular-lost-motion connection between the rotor 42 and the actuator 50, and thus between the contact carrier 38 and the actuator, for transmitting rotation of the actuator about the center of curvature 30 to the contact carrier after limited rotation of the actuator relative to the contact carrier. More specifically, the rotation transmitting means 52 comprises two compression springs 54 and 56 each seated at one end against the rotor 42 and at its other end against the actuator 50. Kickers 58 and 60 on the actuator 50 are engageable with the rotor 42 to limit the range of angular lost motion between the actuator and the contact carrier 38 and to displace or kick the roller contact 36 out of the recess 26 or 28 in which it is disposed in a positive manner at the ends of the range of angular lost motion.

The actuator 50 is operated by a rotary drive means 62, Fig. 15, which includes a rotary electric motor 64 and an output shaft 66, there preferably being a speed reduction unit 68 of any suitable type between the motor and the output shaft. The invention includes means 70 providing a driving connection between the output shaft 66 and the actuator 50 so as to transmit rotation of the output shaft to the actuator to move the actuator about the center of curvature 30 of the contact path 24. In the embodiment under consideration, the driving connection provided by the means 70 includes a gear segment 72 fixed on the output shaft 66 and a gear segment 74 fixed on the shaft 46 and adapted to be meshed with the gear segment 72. The gear segment 72 includes two gear teeth 76 and 78 and the gear segment 74 includes two gear teeth 80 and 82.

In the embodiment under consideration, the rotary motor 64 is a reversible motor which oscillates the gear segment 72 back and forth into and out of mesh with the gear segment 74 first in one direction and then the other, thereby oscillating the roller contact 36 back and forth between the recesses 26 and 28. In the particular construction illustrated, the angular spacing between the recesses 26 and 28 is 45° and the angular lost motion provided by the rotation transmitting means 52 between the actuator 50 and the rotor 42 is ±20°. However, it will be understood that other angular spacings between the recesses 26 and 28 and other angular lost motions between the rotor 42 and the actuator 50 may be utilized.

Considering the operation of the hereinbefore-described embodiment of the invention, it will be assumed, first of all, that the rotary motor 64 is energized to drive the gear segment 72 in the direction of the arrow 84 to bring this gear segment into mesh with the gear segment 74 while the roller contact 36 is in the recess 26. Under such conditions, the springs 54 and 56 center the actuator 50 relative to the rotor 42 so as to position the gear tooth 80 for engagement by the gear tooth 76.

Figure 2:
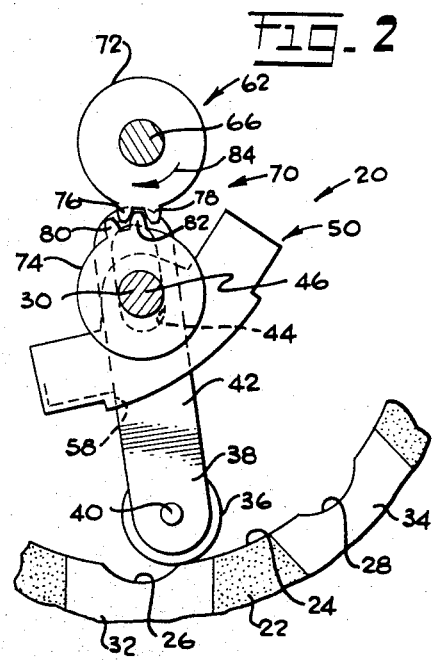

Referring to Fig. 2 of the drawings, the motor 64 has driven the gear segment 72 far enough to bring the gear tooth 78 thereon into engagement with the gear tooth 82 on the gear segment 74 connected to the actuator 50. At this point, the actuator 50 has been moved to one end of its range of angular lost motion relative to the rotor 42, whereupon the kicker 58 has engaged the rotor to displace the roller contact 36 out of the recess 26. Prior to the time the kicker 58 engaged the rotor 42, the spring 54 was compressed to store energy therein, the spring 48 having held the roller contact 36 in the recess 26 in opposition to the action of the spring 54 until engagement of the kicker 58 with the rotor 42.

Figure 3:
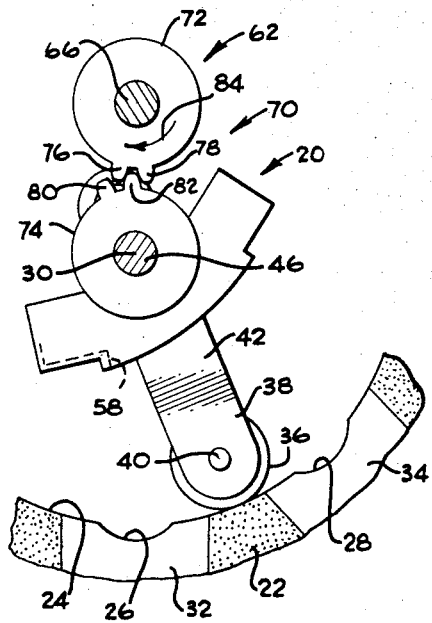
Figure 4:
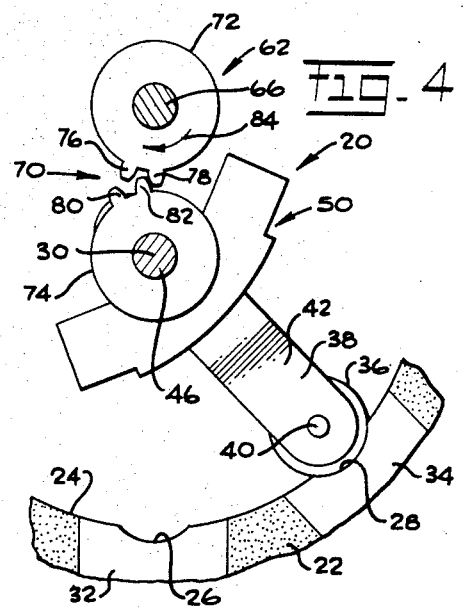

Considering Figs. 3 and 4 of the drawings, once the roller contact 36 is kicked out of the recess 26 by the kicker 58, the energy stored in the spring 54 causes the roller contact to jump very rapidly from the recess 26 to the recess 28. The range of relative angular movement between the rotor 42 and the actuator 50 from the centered or neutral position of the rotor relative to the actuator is such that the energy stored in the spring 54 causes the roller contact 36 to jump all the way from the recess 26 to the recess 28, irrespective of the presence of the driving connection 70 between the output shaft 66 of the rotary drive means 62 and the shaft 46. Thus, once the roller contact 36 starts its jump to the recess 28, it goes all the way despite the connection to the rotary motor 64.

The energy stored in the spring 54 as the kicker 58 is brought into engagement with the rotor 42 to displace the roller contact 36 out of the recess 26, moves the roller contact from the recess 26 to the recess 28 extremely rapidly. This minimizes arcing as electrical contact is made and/or broken.

Figure 5:
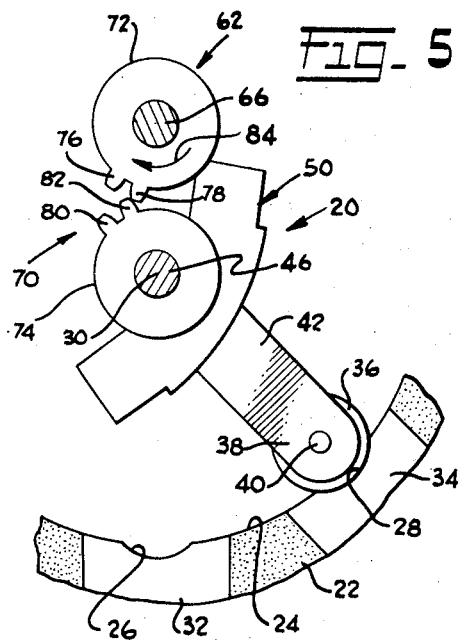
Figure 6:
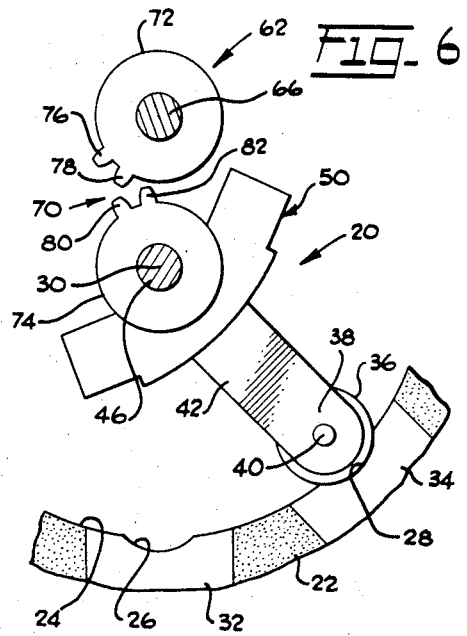
Figure 7:
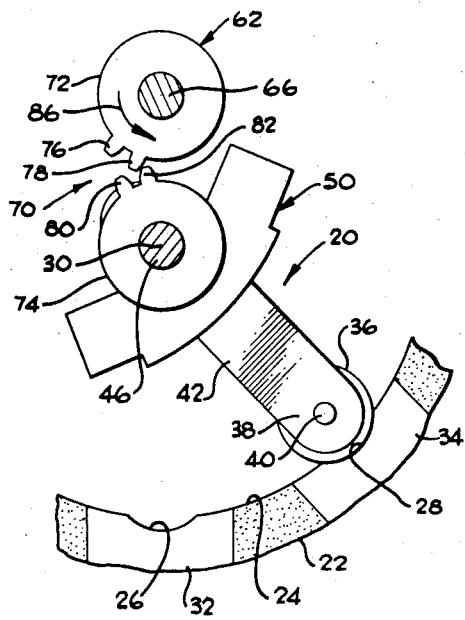

During the interval that the roller contact 36 is jumping from the recess 26 to the recess 28, the gear segment 72 continues to rotate relative to the gear segment 74 with the gear tooth 78 in engagement with the gear tooth 82. As shown in Fig. 5 of the drawings, continued rotation of the gear segment 72 relative to the gear segment 74 results in cocking of the actuator 50 relative to the rotor 42, but this cocking is not sufficient to bring the kicker 58 into reengagement with the rotor 42 so that there is no tendency to displace the roller contact 36 out of the recess 28 in the counterclockwise direction. Ultimately, the gear tooth 78 disengages the gear tooth 82, as shown in Fig. 6 of the drawings, whereupon the springs 54 and 56 recenter the actuator 50 relative to the rotor 42, and place the gear tooth 82 in a position to be engaged by the gear tooth 78 upon reversal of the direction of rotation of the rotary motor 64 as will be discussed hereinafter.

From the foregoing, it will be apparent that the angular lost motion between the actuator 50 and the rotor 42 is important in three respects. First, it results in energy storage in the spring 54 to cause the roller contact 36 to jump from the recess 26 to the recess 28 upon engagement of the kicker 58 with the rotor 42. Second, it permits the actuator 50 to move relative to the rotor 42 sufficiently to permit the gear segment 72 and the gear segment 74 to disengage, as shown in Fig. 5 of the drawings, after the roller contact 36 has jumped to the recess 28. Third, as shown in Fig. 6, and is discussed hereinafter, it results in positioning of the gear tooth 82 for engagement by the gear tooth 78 upon reversal of the direction of rotation of the motor 64.

Since the gear segment 72 disengages the gear segment 74 after the roller contact 36 jumps to the recess 28, it will be apparent that the angular distance through which the rotary motor 64 coasts after such disengagement is immaterial, the coasting of the motor and the stopping position thereof not being critical. As a matter of fact, even if the mtor 64 coasts far enough to rotate the gear segment 72 through a full additional revolution, this is of no consequence since the gear teeth 76 and 78 will merely move past the gear tooth 82, the actuator 50 cocking into the position of Fig. 5 of the drawings to permit this.

Since the roller contact 36 is caused to jump from the recess 26 to the recess 28 by the spring 54 in a manner which is substantially completely independent of the movement of the rotary motor 64 during such jumping, it will be apparent that the present invention permits the use of a motor speed slow enough to provide reasonably accurate control of the coasting of the motor, and thus of the stopping position thereof, even though the coasting of the motor and the stopping position thereof are not critical, as hereinbefore explained.

Figure 8:
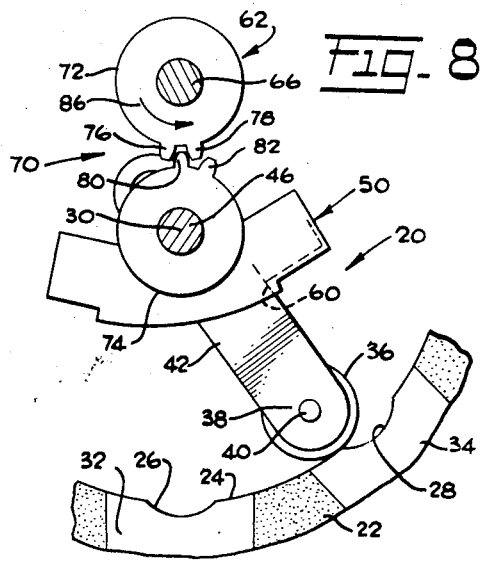
Figure 9:
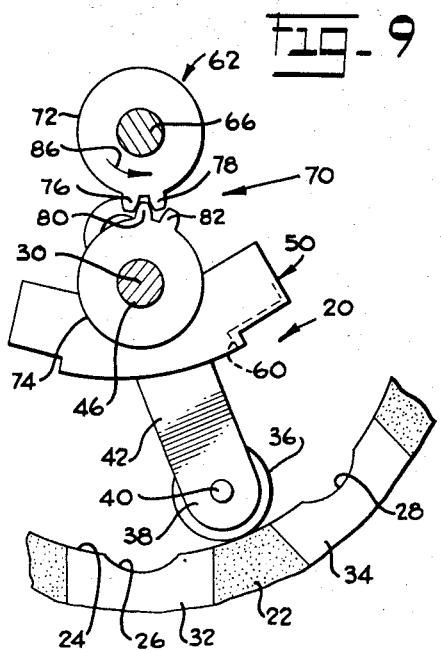
Figure 10:
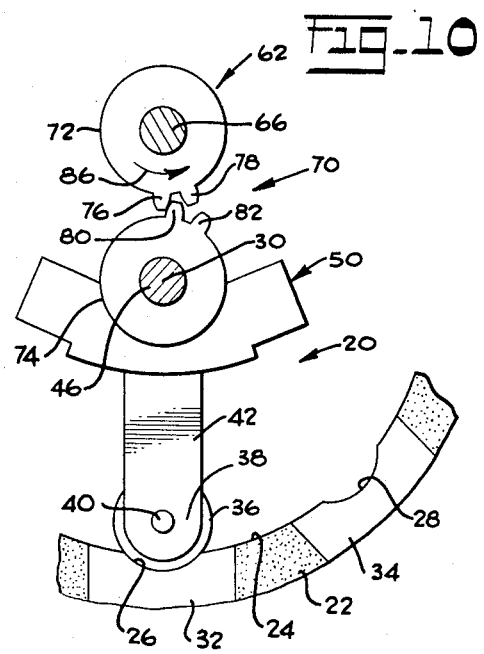
Figure 11:
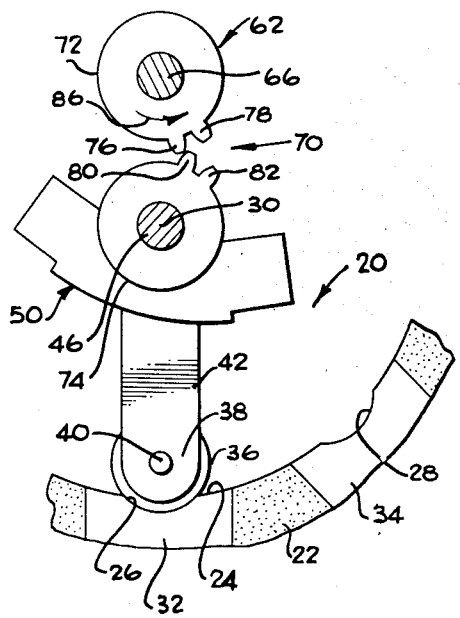
Figure 12:
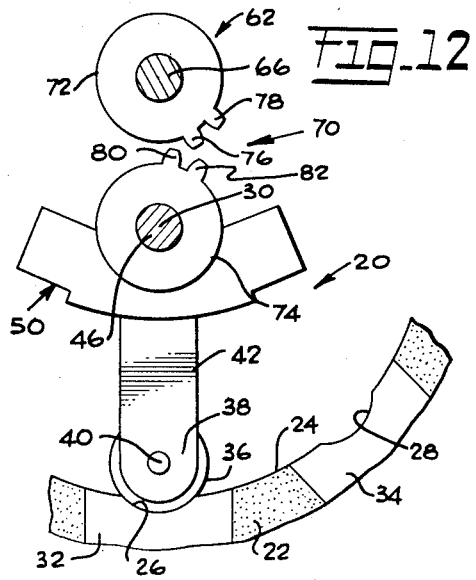

Considering the operation of the embodiment of the invention under discussion when the direction of rotation of the rotary motor 64 is reversed to reverse the direction of rotation of the gear segment 72, as indicated by the arrow 86 in Figs. 7 to 11 of the drawings, the gear tooth 78 first engages the gear tooth 82 to begin to cock the actuator 50 relative to the rotor 42 and thus store energy in the spring 56. As shown in Fig. 8, by the time the gear tooth 76 is in engagement with the gear tooth 80, the spring 56 has been fully compressed and the kicker 60 has engaged the rotor 42 to force the roller contact 36 out of the recess 28 toward the recess 26. The roller contact 36 then jumps from the recess 28 to the recess 26 as the energy stored in the spring 56 is released, this jump being substantially completely independent of the intervening movement of the gear segment 72 by the rotary motor 64. As shown in Figs. 10 and 11, the gear tooth 76 continues to engage the gear tooth 80 to cock the actuator 50 relative to the rotor 42, the gear tooth 76 disengaging the gear tooth 80 before the kicker 60 engages the rotor 42, as shown in Figs. 11 and 12. After disengagement of the gear segments 72 and 74, the springs 54 and 56 restore the actuator 50 to its neutral position relative to the rotor 42 to position the gear tooth 80 for engagement by the gear tooth 76 upon reversal of the rotary motor 64. The positions of the parts in Fig. 12 of the drawings represent the last event in the operating cycle, the cycle subsequently being repeated in the manner hereinbefore described.

It will be apparent that the operation of the embodiment of the invention under consideration is the same in both directions so that the observations hereinbefore presented with respect to the functions of the angular-lost-motion connection 70 and the lack of criticality of the distance that the motor 64 coasts are applicable to either direction of motor rotation.

Referring to Fig. 13 of the drawings, illustrated therein is a switch 90 which is identical to the switch 20 except that instead of being provided with the structure 22 having only the recesses 26 and 28 in the contact path 24 thereof, it includes a structure 92 providing a contact path 94 with a full circle and which is provided with circumferentially spaced recesses 96 in the stationary contacts 98. The switch 90 is intended to be operated unidirectionally, instead of bidirectionally as in the case of the switch 20.

To provide for unidirectional operation of the switch 90, the shaft 46 on which the actuator 50 is mounted carries a full gear 100 with which the gear segment 72 on the output shaft 66 of the rotary drive means 62 is adapted to mesh once per revolution of the output shaft. Each time the gear segment 72 meshes with the gear 100, the roller contact 36 of the switch 90 is jumped from one of the recesses 96 to the next in the manner hereinbefore described in connection with Figs. 1 to 6 of the drawings.

As will be apparent, as the motor 64 rotates the output shaft 66 unidirectionally, the roller contact 36 of the switch 90 is stepped, i.e., is caused to jump from recess 96 to recess 96 progressively as the gear segment 72 rotates, one such jump or step occurring for each revolution of the output shaft 66.

With the embodiment of Fig. 13 of the drawings, the roller contact 36 is in one of the recesses 96 during substantially the entire time required for the output shaft 66 to rotate through one revolution, the roller contact requiring but a few thousandths of a second to jump from one recess to the next. Thus, substantially the entire time required for each revolution of the output shaft 66 is available as contact dwell time to insure proper operation of circuits, not shown, in which the stationary contacts 98 are disposed, this assuming that the rotary motor 64 operates continuously. For example, if the rotational speed of the output shaft 66 is 120 r.p.m., the time required for the output shaft to complete one revolution is one-half second, and virtually all of this time is available as dwell time.

Referring to Fig. 14 of the drawings, illustrated therein is a switch 110 which may be similar to either the switch 20, or the switch 90, i.e., which may either be designed to oscillate back and forth between two recesses, or which may be designed to operate unidirectionally. The output shaft 66 of the rotary drive means 62, in this embodiment, is connected to the shaft 46 of the switch 110 by a Geneva mechanism 112. In this case, the Geneva mechanism 112 is shown as an eight-position mechanism corresponding to an eight-position switch 110 designed to be operated unidirectionally. However, the Geneva mechanism 112 may be varied to provide only two positions spaced apart the distance between the two recesses of a bidirectional switch, such as the switch 20.

The use of a mechanism of the Geneva type to interconnect the switch shaft 46 and the output shaft 66 of the rotary drive means 62 has the advantage of reduced impact upon engagement of the mechanism.

Referring to Fig. 15 of the drawings, the output shaft 66 of the rotary drive means 62 is illustrated therein as having a cascade of switches 120, 122 and 124 connected thereto. The shaft 46 of the switch 120 is directly connected to the output shaft 66 by a unidirectional driving connection of the type hereinbefore disclosed in connection with the embodiment of Fig. 13. The output shaft 66 is provided therein with a gear 126 meshed with a gear 128 on a shaft 130 which is adapted to drive the shaft 46 of the switch 122 through a unidirectional, intermittent driving connection also of the type hereinbefore disclosed in connection with Fig. 13. The gear 128 drives a gear 132, through an idling gear 134, on a shaft 136 which is adapted to drive the shaft 46 of the switch 124 through a unidirectional, intermittent connection again of the type of Fig. 13.

By suitably relating the recess spacings of the switches 120, 122 and 124 and the ratios between the gears 126, 128 and 132, the various switches can be designed to operate with any desired frequency ratios. For example, the roller contact of the switch 122 may be caused to jump twice as frequently as the roller contact of the switch 120 and the roller contact of the switch 124 may be caused to jump three times as fast, these ratios being illustrative only. The important feature about a cascade of this nature is that the motor 64 acts as a timer which controls the frequencies of actuation of the switches driven thereby, no separate timers or interlocks being required.

Although exemplary embodiments of the present invention have been disclosed herein for purposes of illustration, it will be understood that various changes, modifications and substitutions may be incorporated in such embodiments without departing from the spirit of the invention as defined by the claims which follow.

I claim:

1. In combination: a switch including an arcuate contact path having a center of curvature and having circumferentially spaced recesses therein and having thereon at least one stationary contact in which one of said recesses is formed, a contact carrier movable adjacent and parallel to said contact path about said center of curvature of said contact path, a roller contact rotatably mounted on said contact carrier and engaging and movable along said contact path and insertable into each of said recesses, an actuator movable about said center of curvature of said contact path, means providing a resilient angular-lost-motion connection between said actuator and said contact carrier, kicking means carried by said actuator and engageable with said contact carrier for limiting the range of angular lost motion between said actuator and said contact carrier so as to kick said roller contact out of each of said recesses, and resilient means engaging said actuator and said contact carrier for biasing said contact carrier toward said contact path so as to bias said roller contact into engagement with said contact path; rotary drive means including a rotary motor and an output shaft; and means providing an intermittent driving connection between said actuator and said output shaft so as to intermittently transmit rotation of said output shaft to said actuator to intermittently move said actuator about said center of curvature of said contact path.

2. In combination: a switch including an arcuate contact path having a center of curvature and having circumferentially spaced recesses therein and having thereon at least one stationary contact in which one of said recesses is formed, a contact carrier movable adjacent and parallel to said contact path about said center of curvature of said contact path, a roller contact rotatably mounted on said contact carrier and engaging and movable along said contact path and insertable into each of said recesses, an actuator movable about said center of curvature of said contact path, means providing a resilient angular-lost-motion connection between said actuator and said contact carrier, kicking means carried by said actuator and engageable with said contact carrier for limiting the range of angular lost motion between said actuator and said contact carrier so as to kick said roller contact out of each of said recesses, and resilient means engaging said actuator and said contact carrier for biasing said contact carrier toward said contact path so as to bias said roller contact into engagement with said contact path; rotary drive means including a rotary motor and an output shaft; and means providing a driving connection between said actuator and said output shaft so as to transmit rotation of said output shaft to said actuator to move said actuator about said center of curvature of said contact path, said driving connection including gear means.

3. In combination: a switch including an arcuate contact path having a center of curvature and having circumferentially spaced recesses therein and having thereon at least one stationary contact in which one of said recesses is formed, a contact carrier movable adjacent and parallel to said contact path about said center of curvature of said contact path, a roller contact rotatably mounted on said contact carrier and engaging and movable along said contact path and insertable into each of said recesses, an actuator movable about said center of curvature of said contact path, means providing a resilient angular-lost-motion connection between said actuator and said contact carrier, kicking means carried by said actuator and engageable with said contact carrier for limiting the range of angular lost motion between said actuator and said contact carrier so as to kick said roller contact out of each of said recesses, and resilient means engaging said actuator and said contact carrier for biasing said roller contact into engagement with said contact path; rotary drive means including a rotary motor and an output shaft; and means providing a driving connection between said actuator and said output shaft so as to transmit rotation of said output shaft to said actuator to move said actuator about said center of curvature of said contact path, said driving connection including cam means.

4. In combination: a switch including an arcuate contact path having a center of curvature and having circumferentially spaced recesses therein and having thereon at least one stationary contact in which one of said recesses is formed, a contact carrier movable adjacent and parallel to said contact path about said center of curvature of said contact path, a roller contact rotatably mounted on said contact carrier and engaging and movable along said contact path and insertable into each of said recesses, an actuator movable about said center of curvature of said contact path, means providing a resilient angular-lost-motion connection between said actuator and said contact carrier, kicking means carried by said actuator and engageable with said contact carrier for limiting the range of angular lost motion between said actuator and said contact carrier so as to kick said roller contact out of each of said recesses, and resilient means engaging said contact carrier for biasing said roller contact into engagement with said contact path; rotary drive means including a rotary motor and an output shaft; and means providing a driving connection between said actuator and said output shaft so as to transmit rotation of said output shaft to said actuator to move said actuator about said center of curvature of said contact path, said driving connection including meshable gear segments respectively connected to said output shaft and said actuator.

5. In combination: a switch including an arcuate contact path having a center of curvature and having circumferentially spaced recesses therein and having thereon at least one stationary contact in which one of said recesses is formed, a contact carrier movable adjacent and parallel to said contact path about said center of curvature of said contact path, a roller contact rotatably mounted on said contact carrier and engaging and movable along said contact path and insertable into each of said recesses, an actuator movable about said center of curvature of said contact path, means providing a resilient angular-lost-motion connection between said actuator and said contact carrier, kicking means carried by said actuator and engageable with said contact carrier for limiting the range of angular lost motion between said actuator and said contact carrier so as to kick said roller contact out of each of said recesses, and resilient means engaging said contact carrier for biasing said roller contact into engagement with said contact path; rotary drive means including a rotary motor and an output shaft; and means providing a driving connection between said actuator and said output shaft so as to transmit rotation of said output shaft to said actuator to move said actuator about said center of curvature of said contact path, said driving connection including a gear segment connected to said output shaft and a gear connected to said actuator, said gear segment being meshable with said gear.

6. In combination: at least two switches each including an arcuate contact path having a center of curvature and having circumferentially spaced recesses therein and having thereon at least one stationary contact in which one of said recesses is formed, a contact carrier movable adjacent and parallel to said contact path about said center of curvature of said contact path, a roller contact rotatably mounted on said contact carrier and engaging and movable along said contact path and insertable into each of said recesses, an actuator movable about said center of curvature of said contact path, means providing a resilient angular-lost-motion connection between said actuator and said contact carrier, kicking means carried by said actuator and engageable with said contact carrier for limiting the range of angular lost motion between said actuator and said contact carrier so as to kick said roller contact out of each of said recesses, and resilient means engaging said contact carrier toward said contact path so as to bias said roller contact into engagement with said contact path; rotary drive means including a rotary motor and an output shaft; and means providing a driving connection between said output shaft and said actuator of each of said switches for transmitting rotary movement of said output shaft to such actuator so as to move such actuator about said center of curvature of said contact path of the corresponding switch.

7. In combination: at least two switches each including an arcuate contact path having a center of curvature and having circumferentially spaced recesses therein and having thereon at least one stationary contact in which one of said recesses is formed, a contact carrier movable adjacent and parallel to said contact path about said center of curvature of said contact path, a roller contact rotatably mounted on said contact carrier and engaging and movable along said contact path and insertable into each of said recesses, an actuator movable about said center of curvature of said contact path, means providing a resilient angular-lost-motion connection between said actuator and said contact carrier, kicking means carried by said actuator and engageable with said contact carrier for limiting the range of angular lost motion between said actuator and said contact carrier so as to kick said roller contact out of each of said recesses, and resilient means engaging said contact carrier for biasing said contact carrier toward said contact path so as to bias said roller contact into engagement with said contact path; rotary drive means including a rotary motor and an output shaft; and means providing a driving connection between said output shaft and said actuator of each of said switches for transmitting rotary movement of said output shaft to such actuator so as to move such actuator about said center of curvature of said contact path of the corresponding switch, said driving connection including means for rotating said actuators of said switches at different speeds.

8. In combination: a switch including an arcuate contact path having circumferentially spaced recesses thereing, a contact engaging and movable along said contact path and receivable in each of said recesses, resilient means for biasing said contact into engagement with said contact path, an actuator movable about the center of curvature of said contact path, and resilient, energy-storing means connecting said contact to said actuator and providing limited angular lost motion between said contact and said actuator for forcing said contact out of each of said recesses and for propelling said contact into the next recess with the energy stored therein; rotary drive means including a rotary motor and an output shaft; and means providing an intermittent driving connection between said actuator and said output shaft so as to intermittently transmit rotation of said output shaft to said actuator to intermittently move said actuator about said center of curvature of said contact path.

9. The combination set forth in claim 8 wherein said means providing said intermittent driving connection includes intermittently engageable elements respectively operatively connected to said actuator and to said output shaft.

References Cited in the file of this patent

UNITED STATES PATENTS

| | | |
|---|---|---|
| 2,554,506 | Schwarz | May 29, 1951 |
| 2,557,197 | Nelson | June 19, 1951 |
| 2,565,863 | Linn | Aug. 28, 1951 |
| 2,840,651 | Wenglarz | June 24, 1958 |

FOREIGN PATENTS

| | | |
|---|---|---|
| 612,509 | Germany | Apr. 26, 1935 |
| 730,971 | France | May 24, 1932 |